United States Patent
Ohira

(10) Patent No.: US 9,950,214 B2
(45) Date of Patent: Apr. 24, 2018

(54) MULTI-PIECE SOLID GOLF BALL

(71) Applicant: Bridgestone Sports Co., Ltd., Tokyo (JP)

(72) Inventor: Takashi Ohira, Chichibushi (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 15/278,690

(22) Filed: Sep. 28, 2016

(65) Prior Publication Data

US 2018/0085634 A1    Mar. 29, 2018

(51) Int. Cl.
*A63B 37/00* (2006.01)

(52) U.S. Cl.
CPC ...... *A63B 37/0039* (2013.01); *A63B 37/0027* (2013.01); *A63B 37/0075* (2013.01); *A63B 37/0092* (2013.01)

(58) Field of Classification Search
CPC ............ A63B 37/0039; A63B 37/0074; A63B 37/0075; A63B 37/0076
See application file for complete search history.

(56) References Cited

U.S. PATENT DOCUMENTS

| | | | | |
|---|---|---|---|---|
| 4,871,589 A | * | 10/1989 | Kitaoh | A63B 37/12 |
| 5,976,035 A | * | 11/1999 | Umezawa | A63B 37/0003 473/364 |
| 6,106,415 A | * | 8/2000 | Masutani | A63B 37/0003 473/373 |
| 2003/0187152 A1 | * | 10/2003 | Shimura | C08G 18/10 525/450 |
| 2006/0084757 A1 | * | 4/2006 | Isogawa | A63B 37/0003 524/591 |
| 2006/0178471 A1 | * | 8/2006 | Sasaki | A63B 37/0003 524/591 |
| 2006/0211517 A1 | * | 9/2006 | Isogawa | A63B 37/0031 473/371 |
| 2007/0117654 A1 | * | 5/2007 | Sasaki | A63B 37/0003 473/351 |
| 2009/0325731 A1 | * | 12/2009 | Sullivan | A63B 37/0033 473/376 |

FOREIGN PATENT DOCUMENTS

JP    2011-11088 A    1/2011

* cited by examiner

*Primary Examiner* — John E Simms, Jr.
(74) *Attorney, Agent, or Firm* — Sughrue Mion, PLLC

(57) ABSTRACT

A multi-piece solid golf ball having a core, at least one intermediate layer encasing the core and at least one outer layer encasing the intermediate layer is characterized in that the intermediate layer is formed of a resin composition containing a specific acid-containing polymer or ionomer resin, and the outer layer is formed of primarily a polyurethane or a polyurea. The ball also has, between the intermediate layer and the outer layer, a bonding layer made of a polycarbonate and/or polyether-type aqueous polyurethane dispersion composition which includes a specific aqueous polycarbodiimide.

7 Claims, No Drawings

MULTI-PIECE SOLID GOLF BALL

BACKGROUND OF THE INVENTION

This invention relates to a multi-piece solid golf ball in which a core, an intermediate layer and a cover are formed as successive layers. More specifically, the invention relates to a multi-piece solid golf ball which, in spite of having a soft urethane cover (outer layer) that is thinly designed, is able to maintain a good durability.

Numerous multi-piece solid golf balls of three or more pieces in which an intermediate layer is interposed between a core and a cover and the respective layers are of specified hardnesses and thicknesses have thereto been disclosed. The cover and the intermediate layer, as layers which encase the core, are important elements for lowering the spin rate of the ball on shots with a driver and providing suitable spin control on approach shots. At the same time, there is a desire to improve the adhesion between these layers.

For example, JP-A 2011-11088 describes a multi-piece solid golf ball in which a reinforcing layer that uses a carboxyl group-containing polyurethane and a polycarbodiimide (water-dispersible) is situated between the intermediate layer and the cover. The intermediate layer and cover materials in this golf ball are each formed of an ionomer resin as the base resin.

However, in this prior-art disclosure, although water-dispersible polycarbodiimides have an excellent compatibility with aqueous polyurethanes, the affinity with the ionomer resin or highly neutralized resin composition serving as the base resin decreases. Hence, adhesion between the cover and the intermediate layer can hardly be regarded as sufficient.

Recently, the use of urethane materials as the base resin in cover materials for multi-piece solid golf balls is often seen. In golf balls having a cover made of a urethane material, when an ionomer resin or a highly neutralized resin composition is used as the base resin of the intermediate layer, there is a desire for good affinity or adhesion between the intermediate layer and the urethane cover. In particular, there exist recently many golf balls in which the outermost cover layer has a small thickness. Even when a soft urethane cover (outer layer) is designed so as to be thin, there is a strong desire for the ball to be capable of maintaining a good durability on repeated impact while retaining a good spin performance on approach shots.

SUMMARY OF THE INVENTION

In light of the above circumstances, an object of the invention is to provide a multi-piece solid golf ball which, even when the soft urethane cover (outer layer) is designed so as to be thin, is capable of maintaining a good durability on repeated impact while retaining a good spin performance on approach shots.

The inventor has conducted extensive investigations in order to achieve the above object. As a result, he has discovered that, in a multi-piece solid golf ball having a core, an intermediate layer and a cover formed as successive layers, by forming the intermediate layer of a resin composition which contains a specific acid-containing polymer or ionomer resin, forming the outer layer of, as the chief component, a polyurethane or polyurea, and moreover providing, between the intermediate layer and the outer layer, a bonding layer made of a specific polycarbodiimide-containing polycarbonate and/or polyether-type aqueous polyurethane dispersion composition, the durability of the ball can be maintained even when a soft urethane cover (outer layer) is thinly designed. In particular, the inventor has found that, by providing an outer layer (cover) material which is softer than the intermediate layer, the durability of the outer layer (cover) can be enhanced while retaining a good spin performance on approach shots.

Accordingly, the inventor provides the following multi-piece solid golf ball.

[1] A multi-piece solid golf ball having a core, at least one intermediate layer encasing the core, and at least one outer layer encasing the intermediate layer, wherein the intermediate layer is formed of a resin composition containing a base resin selected from the group consisting of (a-1) to (a-4) below:

(a-1) a binary copolymer of an olefin and an $\alpha,\beta$-unsaturated carboxylic acid of 3 to 8 carbon atoms, (a-2) an ionomer resin that is a metal ion neutralization product of a binary copolymer of an olefin and an $\alpha,\beta$-unsaturated carboxylic acid of 3 to 8 carbon atoms, (a-3) a ternary copolymer of an olefin, an $\alpha,\beta$-unsaturated carboxylic acid of 3 to 8 carbon atoms, and an $\alpha,\beta$-unsaturated carboxylic acid ester, and (a-4) an ionomer resin that is a metal ion neutralization product of a ternary copolymer of an olefin, an $\alpha,\beta$-unsaturated carboxylic acid of 3 to 8 carbon atoms, and an $\alpha,\beta$-unsaturated carboxylic acid ester;

the outer layer is formed of, as a primary ingredient, a polyurethane or a polyurea; and the ball has, between the intermediate layer and the outer layer, a bonding layer made of a polycarbonate and/or polyether-type aqueous polyurethane dispersion composition which includes a polycarbodiimide having a carbodiimide equivalent weight (NCN equivalent weight) of at least 300.

[2] The multi-piece solid golf ball of [1], wherein the carbodiimide equivalent weight (NCN equivalent weight) of the polycarbodiimide is at least 350.

[3] The multi-piece solid golf ball of [1], wherein the carbodiimide equivalent weight (NCN equivalent weight) of the polycarbodiimide is at least 550.

[4] The multi-piece solid golf ball of [1], wherein the primary ingredient of the outer layer is a polyether-type polyurethane elastomer.

[5] The multi-piece solid golf ball of [1], wherein the aqueous polyurethane dispersion composition has a carbodiimide concentration, based on primary ingredient solids therein, of from 1 to 10 wt %.

[6] The multi-piece solid golf ball of [1], wherein the aqueous polyurethane dispersion composition has a molar ratio (i)/(ii) of carbodiimide groups (i) to carboxyl groups (ii) of from 0.07 to 0.50.

[7] The multi-piece solid golf ball of [1], wherein the outer layer and the intermediate layer have a relationship that satisfies the following conditions:

(material hardness of outer layer)≤(material hardness of intermediate layer); and (thickness of outer layer)≤(thickness of intermediate layer).

DETAILED DESCRIPTION OF THE INVENTION

The invention is described in greater detail below.

The multi-piece solid golf ball of the invention, although not shown in a diagram, is a golf ball having a core, an intermediate layer encasing the core, and an outer layer (cover) encasing the intermediate layer. The core, intermediate layer and outer layer are each not limited to a single layer and may be formed as a plurality of two or more layers.

In this invention, the core has a diameter which, although not particularly limited, is preferably at least 23.0 mm, more preferably at least 30.0 mm, and even more preferably at least 34.0 mm. The diameter has no particular upper limit, but is preferably not more than 41.0 mm, more preferably not more than 40.0 mm, and even more preferably not more than 39.0 mm. At a core diameter outside of this range, the initial velocity of the ball may decrease or the ball may have a poor feel at impact.

The core material is not particularly limited. The core can be formed using, for example, a rubber composition containing a co-crosslinking agent, an organic peroxide, an inert filler, an organosulfur compound and the like. The use of polybutadiene as the base rubber of the rubber composition is preferred.

From the standpoint of obtaining a cured and molded rubber composition that has a high resilience and increases the distance traveled by the ball, this polybutadiene is preferably one synthesized with a rare-earth catalyst or a group VIII metal compound catalyst. A polybutadiene synthesized with a rare-earth catalyst is especially preferred.

Rubber components other than the above polybutadiene may be included in the rubber composition within ranges that do not detract from the advantageous effects of the invention. Illustrative examples of rubber components other than the above polybutadiene include other polybutadienes and also other diene rubbers, such as styrene-butadiene rubber, natural rubber, isoprene rubber and ethylene-propylene-diene rubber.

Examples of co-crosslinking agents include α,β-unsaturated carboxylic acids having 3 to 8 carbon atoms, and metal salts of such unsaturated carboxylic acids.

Specific examples of unsaturated carboxylic acids include acrylic acid, methacrylic acid, maleic acid and fumaric acid. The use of acrylic acid or methacrylic acid is especially preferred.

Metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is generally at least 10 parts by weight, preferably at least 15 parts by weight, and more preferably at least 18 parts by weight. The amount included is generally not more than 60 parts by weight, preferably not more than 50 parts by weight, more preferably not more than 45 parts by weight, and most preferably not more than 40 parts by weight. Too much may make the core too hard, giving the ball an unpleasant feel at impact, whereas too little may lower the rebound.

The organic peroxide may be a commercially available product, preferred examples of which include Percumyl D (NOF Corporation), Perhexa 3M (NOF Corporation) and Luperco 231XL (Atochem Co.). These may be used singly or two or more may be used in combination.

The amount of organic peroxide included per 100 parts by weight of the base rubber is generally at least 0.1 part by weight, preferably at least 0.3 part by weight, more preferably at least 0.5 part by weight, and most preferably at least 0.7 part by weight. The upper limit is generally not more than 5 parts by weight, preferably not more than 4 parts by weight, more preferably not more than 3 parts by weight, and most preferably not more than 2 parts by weight. When too much or too little is included, it may not be possible to obtain a ball having a good feel, durability and rebound.

Inert fillers that may be preferably used include zinc oxide, barium sulfate and calcium carbonate. These may be used singly or two or more may be used in combination.

The amount of inert filler included per 100 parts by weight of the base rubber is generally at least 1 part by weight, and preferably at least 5 parts by weight. The upper limit is generally not more than 100 parts by weight, preferably not more than 80 parts by weight, and more preferably not more than 60 parts by weight. When too much or too little inert filler is included, it may not be possible to obtain the right mass and a suitable rebound.

In addition, an antioxidant may be optionally included. Examples of commercial antioxidants include Nocrac NS-6 and Nocrac NS-30 (from Ouchi Shinko Chemical Industry Co., Ltd.), and Yoshinox 425 (Yoshitomi Pharmaceutical Industries, Ltd.). These may be used singly or two or more may be used in combination.

The amount of antioxidant included can be set to more than 0 part by weight, preferably at least 0.05 part by weight, and more preferably at least 0.1 part by weight, per 100 parts by weight of the base rubber. The upper limit is generally not more than 3 parts by weight, preferably not more than 2 parts by weight, more preferably not more than 1 part by weight, and most preferably not more than 0.5 part by weight. When too much or too little antioxidant is included, it may not be possible to obtain a good rebound and durability.

An organosulfur compound may be included in the core so as improve the rebound of the golf ball and to increase the initial velocity of the golf ball. In such cases, the organosulfur compound is included in an amount, per 100 parts by weight of the base rubber, of preferably at least 0.05 part by weight, more preferably at least 0.1 part by weight, and even more preferably at least 0.2 part by weight. When too little is included, a rebound improving effect is unlikely to be obtained. The upper limit in the amount of organosulfur compound included per 100 parts by weight of the base rubber may be set to preferably not more than 5 parts by weight, more preferably not more than 3 parts by weight, and even more preferably not more than 2.5 parts by weight. When too much is included, a further rebound improving effect (particularly on shots with a W#1) is unlikely to be obtained and the core may become too soft, worsening the feel at impact.

It is desirable for the core to be produced as follows. The core composition containing the above ingredients is intensively mixed using a typical mixing apparatus, such as a Banbury mixer or a roll mill, and then compression molded or injection molded in a core mold. The molded body is then suitably heated and cured at a temperature sufficient for the crosslinking agent and co-crosslinking agent to act, generally at about 130 to 170° C., especially 150 to 160° C., for a period of 10 to 40 minutes, especially 12 to 20 minutes, so as to achieve a specific hardness profile.

Next, the intermediate layer is described.

The material hardness of the intermediate layer is not particularly limited, although the Shore D hardness (the value measured with a type D durometer in general accordance with ASTM D2240; the same applies below) is preferably at least 50, more preferably at least 55, and even more preferably at least 60. The upper limit in the material hardness of the intermediate layer, expressed in terms of Shore D hardness, is preferably not more than 68, more preferably not more than 65, and even more preferably not more than 64. When the intermediate layer is too soft, the spin rate may rise excessively on full shots, as a result of which a good distance may not be obtained. On the other hand, when the intermediate layer is too hard, the durability to cracking on repeated impact may worsen and the feel of the ball at impact on shots with a putter and on short approaches may be too hard.

The intermediate layer has a thickness which is preferably at least 0.8 mm, more preferably at least 1.0 mm, and even more preferably at least 1.2 mm. The upper limit is preferably not more than 2.4 mm, more preferably not more than 1.7 mm, and even more preferably not more than 1.4 mm. The intermediate layer is preferably formed so as to be thicker than the subsequently described outer layer (cover). When the intermediate layer has a thickness outside of this range or is thinner than the outer layer (cover), the spin rate-lowering effect on shots with a driver (W#1) may be inadequate, as a result of which a good distance may not be obtained.

A resin composition containing a base resin selected from the group consisting of (a-1) to (a-4) below is used as the intermediate layer material:
- (a-1) a binary copolymer of an olefin and an α,β-unsaturated carboxylic acid of 3 to 8 carbon atoms;
- (a-2) an ionomer resin that is a metal ion neutralization product of a binary copolymer of an olefin and an α,β-unsaturated carboxylic acid of 3 to 8 carbon atoms;
- (a-3) a ternary copolymer of an olefin, an α,β-unsaturated carboxylic acid of 3 to 8 carbon atoms, and an α,β-unsaturated carboxylic acid ester; and
- (a-4) an ionomer resin that is a metal ion neutralization product of a ternary copolymer of an olefin, an α,β-unsaturated carboxylic acid of 3 to 8 carbon atoms, and an α,β-unsaturated carboxylic acid ester.

The olefin in components (a-1) and (a-2) is preferably an olefin having generally at least 2, but not more than 8, and especially not more than 6, carbon atoms. Specific examples of such olefins include ethylene, propylene, butene, pentene, hexene, heptene and octene. The use of ethylene is especially preferred.

Examples of α,β-unsaturated carboxylic acids having 3 to 8 carbon atoms include acrylic acid, methacrylic acid, maleic acid and fumaric acid. The use of acrylic acid and methacrylic acid is especially preferred.

The unsaturated carboxylic acid ester in components (a-3) and (a-4) are exemplified by lower alkyl esters of the above unsaturated carboxylic acids. Specific examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, i-butyl acrylate) is especially preferred.

The content of unsaturated carboxylic acid included in components (a-1) and (a-2) is generally at least 4 wt %, preferably at least 6 wt %, more preferably at least 8 wt %, and even more preferably at least 10 wt %. The upper limit is generally not more than 30 wt %, preferably not more than 20 wt %, more preferably not more than 18 wt %, and even more preferably not more than 15 wt %. The content of unsaturated carboxylic acid included in components (a-3) and (a-4) is generally at least 4 wt %, preferably at least 6 wt %, and more preferably at least 8 wt %. The upper limit is generally not more than 15 wt %, preferably not more than 12 wt %, and more preferably not more than 10 wt %.

When the content of unsaturated carboxylic acid included in components (a-1) to (a-4) is too low, the resilience may decrease; when it is too high, the processability may decrease.

The metal ion neutralization product of the binary copolymer serving as component (a-2) and the metal ion neutralization production of a ternary copolymer serving as component (a-4) can each be obtained by neutralizing some or all of the acid groups in the respective copolymers with metal ions.

The metal ions that neutralize acid groups in the copolymers are exemplified by $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, $Na^+$, $Li^+$, $Zn^{++}$ and $Mg^{++}$ are preferred. From the standpoint of improving resilience, the use of $Na^+$ and $Mg^{++}$ is especially preferred.

The method for obtaining metal ion neutralization products of the above copolymers using such metal ions should involve neutralization by adding, for example, a compound such as a formate, acetate, nitrate, carbonate, bicarbonate, oxide, hydroxide or alkoxide of the above metal ions to the copolymer having acid groups. The degree of neutralization of the acid groups by these metal ions is not particularly limited in this invention.

Commercial products may be used as components (a-1) and (a-2). Examples of the binary copolymer serving as component (a-1) include Nucrel 1560, 1214 and 1035 (all from DuPont-Mitsui Polychemicals Co., Ltd.), and ESCOR 5200, 5100 and 5000 (all from EXXONMOBIL CHEMICAL). Examples of the metal ion neutralization product serving as component (a-2) include Himilan 1554, 1557, 1601, 1605, 1706 and AM7311 (all from DuPont-Mitsui Polychemicals Co., Ltd.), Surlyn 7930 (E.I. DuPont de Nemours & Co.), and Iotek 3110 and 4200 (EXXONMOBIL CHEMICAL). Examples of the ternary copolymer serving as component (a-3) include Nucrel AN4311 and AN4318 (both from DuPont-Mitsui Polychemicals Co., Ltd.), and ESCOR ATX325, ATX320 and ATX310 (all from EXXONMOBIL CHEMICAL). Examples of the metal ion neutralization product of a ternary copolymer serving as component (a-4) include Himilan 1855, 1856 and AM7316 (all from DuPont-Mitsui Polychemicals Co., Ltd.), Surlyn 6320, 8320, 9320 and 8120 (all from E.I. DuPont de Nemours & Co.), and Iotek 7510 and 7520 (both from EXXONMOBIL CHEMICAL). Each of these ingredients may be used singly or two or more may be used in combination.

With regard to the intermediate layer material, as subsequently described, it is preferable to abrade the surface of the intermediate layer in order to increase the degree of adhesion with the polyurethane or polyurea resin material that is preferably used as the outer layer (cover). Next, as subsequently described, a bonding layer is interposed between the intermediate layer and the outer layer (cover).

The bonding layer is composed of polycarbonate and/or polyether-type aqueous polyurethane dispersion composition that includes a polycarbodiimide having a carbodiimide equivalent weight (NCN equivalent weight) of at least 300. With this bonding layer, interlaminar bonding between the intermediate layer and the outer layer (cover) can be enhanced. An aqueous carbodiimide is preferably used as the polycarbodiimide. With water dispersible-type polycarbodiimides and oil-type polycarbodiimides (in which case, the base resin is also a solvent-type polyurethane resin), there are times where, owing presumably to poor affinity with the intermediate layer resin and weak ionicity, reactions with acid groups in the intermediate layer resin do not fully proceed and a sufficient bonding effect is not obtained.

The bonding layer has a thickness which, although not particularly limited, is preferably from 0.5 to 15 μm, more preferably from 1 to 10 μm, and even more preferably from 2 to 8 μm. When this bonding layer is thin, a sufficient adhesive strength may not be achieved between the intermediate layer and the outer layer. On the other hand, when the bonding layer is too thick, the synthetic resin material may flow into the support pins, etc. during molding of the outer layer, worsening the appearance and weakening the durability of the cover.

The polycarbodiimide plays an important role in enhancing adhesion between the outer layer and the intermediate layer. When the polycarbodiimide has a carbodiimide equivalent weight (NCN equivalent weight) in the range of 200 to 800, the solubility and processability are excellent. In particular, the carbodiimide equivalent weight (NCN equivalent weight) is preferably at least 300, more preferably at least 350, and most preferably at least 550. Here, "carbodiimide equivalent weight (NCN equivalent weight)" refers to the chemical formula weight of polycarbodiimide per mole of carbodiimide groups. However, when the carbodiimide equivalent weight (NCN equivalent weight) is too large, the amount of polycarbodiimide that needs to be added increases, and so the solubility and processability worsen. Also, the proportion of urethane resin in the bonding layer may decline and the adhesive strength with the urethane resin serving as the outer layer resin material may decrease.

It is desirable for the polycarbodiimide to be nonionic and to have a pH of at least 6, preferably at least 8, and more preferably at least 10. When this pH is low, the reactivity within the intermediate layer ceases to be adequate and a sufficient adhesive strength with the intermediate layer may not be obtained. However, when the pH is larger than 12, the reactivity becomes too high and the length of time that the adhesive can be used becomes extremely short, which may worsen productivity.

It is preferable to include the aqueous polycarbodiimide in the aqueous polyurethane dispersion composition in such a way that the concentration of carbodiimide becomes 1 to 10 wt %, based on the primary ingredient solids in the aqueous polyurethane dispersion composition. The molar ratio (i)/(ii) of carbodiimide groups (i) to carboxyl groups (ii) is preferably from 0.07 to 0.50. When the concentration and molar ratio are lower than these ranges, adhesion between the outer layer and the intermediate layer may be inadequate. On the other hand, when the concentration and molar ratio are high, due to a decrease in the proportion of urethane component within the adhesive, the affinity with the urethane resin serving as the outer layer material decreases, in addition to which the heat resistance of the bonding layer rises excessively, which may lead to a decline in melt affinity with the cover resin that melts at a high temperature during molding of the cover and, in turn, a decrease in adhesive strength. Moreover, after drying, unreacted material sometimes remains on the surface of the intermediate layer. As a result, tackiness may persist and adhesion with the outer layer (cover) may worsen.

Next, the outer layer (also referred to as the "cover") used in this invention has a material hardness, expressed in terms of Shore D hardness, which is preferably at least 30, more preferably at least 35, and even more preferably at least 40. The upper limit in the material hardness of the outer layer is preferably not more than 60, more preferably not more than 55, and even more preferably not more than 50. When the outer layer (cover) is softer than this range, the spin rate on shots with a driver (W#1) or an iron may rise excessively and a good distance may not be achieved. On the other hand, when the outer layer (cover) is too hard, the spin rate on approach shots may be inadequate or the feel at impact may become too hard.

The material hardness of the outer layer, in relation to the material hardness of the intermediate layer, preferably satisfies the following condition:

(material hardness of outer layer)≤(material hardness of intermediate layer).

That is, by designing the golf ball so that the material hardness of the outer layer is lower than the material hardness of the intermediate layer, a golf ball having an increased spin rate on approach shots can be obtained while holding down the spin rate on shots with a driver.

The outer layer (cover) has a thickness of preferably at least 0.3 mm, more preferably at least 0.45 mm, and even more preferably at least 0.6 mm. The upper limit is preferably not more than 1.5 mm, more preferably not more than 1.2 mm, and even more preferably not more than 0.9 mm. When the outer layer (cover) is too thick, the rebound on full shots with a driver (W#1) or an iron may be inadequate and the spin rate may rise, as a result of which a good distance may not be achieved. Conversely, when the outer layer (cover) is too thin, the scuff resistance may worsen or the ball may not be receptive to spin on approach shots, resulting in a poor controllability.

The outer layer (cover) material is formed of, as the base resin, a polyurethane or a polyurea. The proportion of the overall resin composition accounted for by the polyurethane or polyurea, although not particularly limited, may be set to at least 50 wt %, and preferably at least 80 wt %. The polyurethane and the polyurea are described below.

Polyurethane

The thermoplastic polyurethane material has a structure made up of soft segments composed of a polymeric polyol (polymeric glycol) that is a long-chain polyol, and hard segments composed of a chain extender and a polyisocyanate. Here, the polymeric polyol used as a starting material may be any that has hitherto been used in the art relating to thermoplastic polyurethanes, and is not particularly limited. Examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Specific examples of polyester polyols that may be used include adipate-based polyols such as polyethylene adipate glycol, polypropylene adipate glycol, polybutadiene adipate glycol and polyhexamethylene adipate glycol; and lactone-based polyols such as polycaprolactone polyol. Specific examples of polyether polyols include polyethylene glycol, polypropylene glycol, polytetramethylene glycol and polymethyltetramethylene glycol. These may be used singly, or two or more may be used together.

The number-average molecular weight of these long-chain polyols is preferably in the range of 500 to 5,000. By using a long-chain polyol having such a number-average molecular weight, golf balls made of a thermoplastic polyurethane composition whose various properties such as the rebound and productivity described above are excellent can be reliably obtained. The number-average molecular weight of the long-chain polyol is more preferably in the range of 1,500 to 4,000, and even more preferably in the range of 1,700 to 3,500. The "number-average molecular weight" mentioned here refers to the number-average molecular weight calculated based on the hydroxyl value measured in general accordance with JIS-K1557.

Any chain extender that has hitherto been employed in the art relating to thermoplastic polyurethanes may be advantageously used without particular limitation as the chain extender. For example, in this invention, use can be made of a low-molecular-weight compound with a molecular weight of 2,000 or less which has on the molecule two or more active hydrogen atoms capable of reacting with isocyanate groups. Of these, preferred use can be made of a fatty diol having 2 to 12 carbon atoms. Illustrative examples include 1,4-butylene glycol, 1,2-ethylene glycol, 1,3-butanediol, 1,6-hexanediol and 2,2-dimethyl-1,3-propanediol. Of these, preferred use can be made of, in particular, 1,4-butylene glycol.

Any polyisocyanate that has hitherto been employed in the art relating to thermoplastic polyurethanes may be advantageously used without particular limitation as the polyisocyanate. For example, use may be made of one, two or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. However, depending on the type of isocyanate, the crosslinking reaction during injection molding may be difficult to control.

Although not essential ingredients, elastomers or thermoplastic resins other than thermoplastic polyurethanes may also be included.

No particular limitation is imposed on the method of preparing the thermoplastic polyurethane. Preparation may be carried out by either a prepolymer process or a one-shot process using a known urethane-forming reaction.

A commercial product may be advantageously used as the thermoplastic polyurethane material. Illustrative examples include the products available under the trade name "Pandex" from DIC Bayer Polymer, Ltd., and the products available under the trade name "Resamine" from Dainichiseika Color & Chemicals Mfg. Co., Ltd.

Polyurea

The polyurea is a resin composition composed primarily of urea linkages formed by reacting (i) an isocyanate with (ii) an amine-terminated compound. This resin composition is described in detail below.

(i) Isocyanate

Isocyanates that may be used are preferably ones used in the prior art relating to thermoplastic polyurethanes, but are not subject to any particular limitation. Use may be made of isocyanates similar to those described above in connection with the polyurethane material.

(ii) Amine-Terminated Compound

An amine-terminated compound is a compound having an amino group at the end of the molecular chain. In this invention, the long-chain polyamines and/or amine curing agents shown below may be used.

A long-chain polyamine is an amine compound which has on the molecule at least two amino groups capable of reacting with isocyanate groups, and which has a number-average molecular weight of from 1,000 to 5,000. In this invention, the number-average molecular weight is preferably from 1,500 to 4,000, and more preferably from 1,900 to 3,000. Within this average molecular weight range, the rebound and productivity are even better.

An amine curing agent is an amine compound which has on the molecule at least two amino groups capable of reacting with isocyanate groups, and which has a number-average molecular weight of less than 1,000. In this invention, the number-average molecular weight is preferably less than 800, and more preferably less than 600.

Although not an essential component, in addition to above components (i) and (ii), a polyol may also be included in the polyurea. The polyol is not particularly limited, but is preferably one that has hitherto been used in the art relating to thermoplastic polyurethanes.

From the standpoint of the controllability and scuff resistance of the ball, the resin composition containing the above polyurethane or polyurea preferably uses a polyurethane. From the standpoint of mass productivity, a thermoplastic polyurethane elastomer is preferred, and a polyether-type polyurethane elastomer is more preferable. The reason is that polyester-type polyurethanes have a low hydrolysis resistance and are not very desirable for use in golf balls, the use of a polyether-type or polycarbonate-type polyurethane elastomer being preferred. In particular, when taking cost into account, the use of a polyether-type polyurethane elastomer is especially preferred.

Where necessary, various additives may be included in the above-described resin materials for the intermediate layer and the outer layer (cover). Examples of such additives include pigments, dispersants, antioxidants, ultraviolet absorbers, ultraviolet stabilizers, mold release agents, plasticizers and inorganic fillers (e.g., zinc oxide, barium sulfate, titanium dioxide).

The method of manufacturing multi-piece solid golf balls having the above-described core, intermediate layer and outer layer (cover) formed therein as successive layers is not particularly limited. For example, use can be made of the following methods. In one method, a multi-piece golf ball can be obtained by placing, as the core, a molded and cured material composed primarily of rubber in an injection mold and injecting an intermediate layer material over the core so as to give an intermediate sphere; subsequently spray coating, dip coating or brush coating the above-described adhesive composition onto this intermediate sphere to give an intermediate sphere having a bonding layer of a given thickness; and finally placing this sphere in another injection mold and injection-molding the outer layer (cover) material over the sphere. Alternatively, the outer layer (cover) can be formed by a method that involves encasing the intermediate sphere within the outer layer, an example of this being to enclose the intermediate sphere within two prefabricated hemispherical half-cups and subsequently carry out molding under applied heat and pressure.

Numerous dimples are typically formed on the surface of the outer layer (cover). No particular limitation is imposed on the dimples arranged on the cover surface.

The golf ball of the invention can be made to conform to the Rules of Golf for play. Specifically, it is preferable for the ball diameter to be of a size that does not allow the ball to pass through a ring having an inner diameter of 42.672 mm and is not more than 42.80 mm, and for the weight to be from 45.0 to 45.93 g.

In this invention, various types of treatment, such as surface preparation, stamping and painting, may be optionally carried out on the cover surface in order to enhance the design qualities and durability of the golf ball.

As explained above, in the multi-piece solid golf ball of the invention, even when the soft urethane cover (outer layer) is thinly designed, the durability of the outer layer (cover) can be enhanced while maintaining a good spin performance on approach shots.

EXAMPLES

Working Examples and Comparative Examples are provided below to illustrate the invention, and are not intended to limit the scope thereof.

Working Examples 1 to 11, Comparative Examples 1 and 2

Solid cores having a diameter of 38.6 mm were produced by preparing a core composition common to all of the Examples using the formulation shown in Table 1 below, and subsequently molding and vulcanizing under vulcanization conditions of 155° C. and 15 minutes.

TABLE 1

| Core formulation (pbw) | Amount included |
|---|---|
| Polybutadiene A | 80 |
| Polybutadiene B | 20 |
| Peroxide | 1 |
| Barium sulfate | 11 |
| Zinc oxide | 4 |
| Antioxidant | 0.1 |
| Zinc acrylate | 38 |
| Water | 0.8 |
| Zinc salt of pentachlorothiophenol | 0.3 |

Details on the ingredients in Table 1 are given below.
Polybutadiene A: Available under the trade name "BR01" from JSR Corporation
Polybutadiene B: Available under the trade name "BR51" from JSR Corporation
Peroxide: Dicumyl peroxide, available under the trade name "Percumyl D" from NOF Corporation
Barium sulfate: Available under the trade name "Barico #100" from Hakusui Tech
Zinc oxide: Available under the trade name "Zinc Oxide Grade 3" from Sakai Chemical Co., Ltd.
Antioxidant: 2,2-Methylenebis(4-methyl-6-butylphenol), available under the trade name "Nocrac NS-6" from Ouchi Shinko Chemical Industry Co., Ltd.
Zinc acrylate: Available from Nippon Shokubai Co., Ltd.
Water: Distilled water, from Wako Pure Chemical Industries, Ltd.

Formation of Intermediate Layer and Bonding Layer

An intermediate layer-encased sphere was obtained by injection molding, over the core obtained above, an intermediate layer material having, as shown in Table 2, a common formulation in all the Examples. The thickness of the intermediate layer in the Examples was 1.25 mm in each case. Next, an adhesive composition consisting primarily of, as shown in Table 3, a base resin and a curing agent, was spray-coated onto the surface of the intermediate layer-encased sphere to a thickness of 5 μm. The coating conditions at this time were a coating weight of 0.1 g/sphere, a drying temperature of 55° C. and a drying time of 40 minutes. In Comparative Example 2, an adhesive composition was not applied.

Formation of Outermost Layer (Cover) and Dimples

Next, as shown in Table 2, using a resin material having a formulation common to all the Examples, an 0.8 mm thick outermost layer (cover) was formed over the intermediate layer-encased sphere that had been coated with the adhesive composition, thereby producing a golf ball having an intermediate layer and an outermost layer over the core. At this time, although not shown in diagrams, dimples common to all the Working Examples and Comparative Examples were formed on the surface of the core in each Example.

TABLE 2

| Formulation (pbw) | Intermediate layer | Outermost layer (cover) |
|---|---|---|
| Himilan 1605 | 50 | |
| Himilan 1557 | 15 | |
| Himilan 1706 | 35 | |
| Trimethylolpropane | 1.1 | |
| T-8290 | | 75 |
| T-8283 | | 25 |
| Hytrel 4001 | | 11 |
| Titanium oxide | | 3.9 |
| Polyethylene wax | | 1.2 |
| Isocyanate compound | | 7.5 |
| Material hardness (Shore D hardness) | 62 | 47 |

Details on the trade names of the major materials in the table are as follows.
"Himilan": Ionomers available from DuPont-Mitsui Polychemicals Co., Ltd.
Trimethylolpropane: Available from Mitsubishi Gas Chemical Co., Inc.
"T-8290" and "T-8283": MDI-PTMG type thermoplastic polyurethanes available from DIC Bayer Polymer under the trade name "Pandex"
Titanium oxide: "Tipaque R680" available from Ishihara Sangyo Kaisha, Ltd.
"Hytrel": A polyester elastomer available from DuPont-Toray Co., Ltd.
Polyethylene wax: "Sanwax 161P" from Sanyo Chemical Industries, Ltd.
Isocyanate compound: 4,4'-Diphenylmethane diisocyanate

TABLE 3

| Adhesive compositions (pbw) | | Working Example | | | | | | |
|---|---|---|---|---|---|---|---|---|
| | | 1 | 2 | 3 | 4 | 5 | 6 | 7 |
| Base resin | Resamine D-6031 | 100 | 100 | 100 | 100 | 100 | 100 | 100 |
| | Resamine D-6065NP | | | | | | | |
| | NeoRez R-966 | | | | | | | |
| | NeoCryl A-5045 | | | | | | | |

TABLE 3-continued

| Adhesive compositions (pbw) | | 1 | 2 | 3 | 4 | 5 | 6 | 7 |
|---|---|---|---|---|---|---|---|---|
| Curing agent | Resamine D-52 | 0.5 | 1 | 3 | 5 | 7 | 9 | |
| | Carbodilite V02-L2 | | | | | | | 3 |
| | Carbodilite V04 | | | | | | | |
| | Carbodilite E-01 | | | | | | | |
| | Water | 3 | 3 | 3 | 3 | 3 | 3 | 3 |
| Carbodiimide concentration (%) [solids/base resin solids] | | 0.7 | 1.3 | 4.0 | 6.7 | 9.3 | 12.0 | 4.0 |
| Moles of NCN | | 0.0003 | 0.0007 | 0.0020 | 0.0033 | 0.0047 | 0.006 | 0.0031 |
| Moles of COOH | | 0.0096 | 0.0096 | 0.0096 | 0.0096 | 0.0096 | 0.0096 | 0.0096 |
| Molar ratio (NCN/COOH) | | 0.031 | 0.073 | 0.208 | 0.344 | 0.490 | 0.625 | 0.323 |

| Adhesive compositions (pbw) | | Working Example | | | | Comparative Example | |
|---|---|---|---|---|---|---|---|
| | | 8 | 9 | 10 | 11 | 1 | 2 |
| Base resin | Resamine D-6031 | 100 | 100 | | | | No bonding layer |
| | Resamine D-6065NP | | | 100 | | | |
| | NeoRez R-966 | | | | 100 | | |
| | NeoCryl A-5045 | | | | | 100 | |
| Curing agent | Resamine D-52 | | | | | | |
| | Carbodilite V02-L2 | | | 3 | 3.3 | 4.5 | |
| | Carbodilite V04 | 3 | | | | | |
| | Carbodilite E-01 | | 3 | | | | |
| | Water | 3 | 3 | 3 | 3 | 3 | |
| Carbodiimide concentration (%) [solids/base resin solids] | | 4.0 | 4.0 | 4.0 | 4.0 | 4.0 | |
| Moles of NCN | | 0.0036 | 0.0028 | 0.0031 | 0.0034 | 0.0047 | |
| Moles of COOH | | 0.0096 | 0.0096 | 0.0110 | 0.0112 | 0.0112 | |
| Molar ratio (NCN/COOH) | | 0.375 | 0.292 | 0.282 | 0.304 | 0.420 | |

Details on the base resins and curing agents in the table are given below.

Base Resins

"Resamine D-6031"

A polycarbonate urethane dispersion available from Dainichiseika Color & Chemicals Mfg. Co., Ltd.

(solids content, 30 wt %; acid value, 18); pH: 8.

"Resamine D-6065NP"

A polycarbonate urethane dispersion available from Dainichiseika Color & Chemicals Mfg. Co., Ltd.

(solids content, 30 wt %; acid value, 20.5); pH: 8.

"NeoRez R-966"

A polyether urethane dispersion available from DSM Coating Resins, LLC (solids content, 33 wt %; acid value, 19); pH: 7.5.

"NeoCryl A-5045"

A styrene/acrylic copolymer dispersion available from DSM Coating Resins, LLC (solids content, 45 wt %; acid value, 14); pH: 9.5.

Here, "acid value" refers to the number of milligrams of potassium hydroxide required to neutralize the free fatty acids present in 1 g of fat or fatty oil (KOH=56.1).

Curing Agents

"Resamine D-52"

A nonionic aqueous polycarbodiimide available from Dainichiseika Color & Chemicals Mfg. Co., Ltd. (solids content, 40 wt %; NCN equivalent weight=600); pH: 10.

"Carbodilite V02-L2"

A nonionic aqueous polycarbodiimide available from Nisshinbo Chemical Inc. (solids content, 40 wt %; NCN equivalent weight=385); pH: 9.

"Carbodilite V04"

A nonionic aqueous polycarbodiimide available from Nisshinbo Chemical Inc. (solids content, 40 wt %; NCN equivalent weight=334); pH: 7.

"Carbodilite E-01"

A water-dispersible carbodiimide available from Nisshinbo Chemical Inc. (solids content, 40 wt %; NCN equivalent weight=425); pH: 8.5.

Here, "carbodiimide equivalent weight (NCN equivalent weight)" refers to the chemical formula weight of polycarbodiimide per mole of carbodiimide groups.

Each of the resulting golf balls was evaluated by the following methods for durability to continuous impact and durability to topping. The results are shown in Table 4.

(1) Durability to Continuous Impact

The durability of the golf ball was evaluated using an ADC Ball COR Durability Tester produced by Automated Design Corporation (U.S.). This tester has the function of firing a golf ball pneumatically and causing it to consecutively strike two metal plates arranged in parallel. The incident velocity against the metal plates was set at 43 m/s.

After subjecting each ball to this procedure 200 times, the presence/absence and degree of delamination was checked with an ultrasonic flaw detector and rated according to the following criteria.

Excellent: No delamination (less than 5%)
Good: Delaminated region is less than 10%
Normal: Delaminated region is at least 10%, but less than 50%
NG: Delaminated region is 50% or more (2) Durability to Topping Using a swing robot, the golf ball was struck (topped) with the leading edge of a sand wedge (SW) at a head speed (HS) of 40 m/s, following which the condition of the ball at the place of impact was visually examined and rated according to the following criteria.

Excellent: Impact mark is visible, but no apparent delamination or gouging (ball can be used again)
Good: Small scratches are present (ball can be used again)
Normal: No apparent delamination, but scratches/gouging visible
NG: Delamination is apparent

TABLE 4

| | Working Example | | | | | | | | | | | Comparative Example | |
| --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 1 | 2 |
| Durability to consecutive impact | Normal | Exc | Exc | Exc | Exc | Normal | Exc | Normal | Normal | Exc | Good | NG | NG |
| Durability to topping | Good | Exc | Exc | Exc | Exc | Good | Exc | Good | Normal | Exc | Exc | NG | NG |

The invention claimed is:

1. A multi-piece solid golf ball comprising a core, at least one intermediate layer encasing the core, and at least one outer layer encasing the intermediate layer, wherein the intermediate layer is formed of a resin composition containing a base resin selected from the group consisting of (a-1) to (a-4) below:
   (a-1) a binary copolymer of an olefin and an α,β-unsaturated carboxylic acid of 3 to 8 carbon atoms,
   (a-2) an ionomer resin that is a metal ion neutralization product of a binary copolymer of an olefin and an α,β unsaturated carboxylic acid of 3 to 8 carbon atoms,
   (a-3) a ternary copolymer of an olefin, an α,β-unsaturated carboxylic acid of 3 to 8 carbon atoms, and an α,β unsaturated carboxylic acid ester, and
   (a-4) an ionomer resin that is a metal ion neutralization product of a ternary copolymer of an olefin, an α,β unsaturated carboxylic acid of 3 to 8 carbon atoms, and an α,β-unsaturated carboxylic acid ester;
   the outer layer is formed of, as a primary ingredient, a polyurethane or a polyurea; and the ball has, between the intermediate layer and the outer layer, a bonding layer made of a polycarbonate and/or polyether-type aqueous polyurethane dispersion composition which includes a polycarbodiimide having a carbodiimide equivalent weight (NCN equivalent weight) of at least 300; and wherein the aqueous polyurethane dispersion composition has a molar ratio (i)/(ii) of carbodiimide groups (i) to carboxyl groups (ii) of from 0.073 to 0.490, the outer layer has a thickness from 0.3 to 1.5 mm, and the polycarbodiimide has a pH of at least 8.5.

2. The multi-piece solid golf ball of claim 1, wherein the carbodiimide equivalent weight (NCN equivalent weight) of the polycarbodiimide is at least 350.

3. The multi-piece solid golf ball of claim 1, wherein the carbodiimide equivalent weight (NCN equivalent weight) of the polycarbodiimide is at least 550.

4. The multi-piece solid golf ball of claim 1, wherein the primary ingredient of the outer layer is a polyether-type polyurethane elastomer.

5. The multi-piece solid golf ball of claim 1, wherein the aqueous polyurethane dispersion composition has a carbodiimide concentration, based on primary ingredient solids therein, of from 1 to 10 wt %.

6. The multi-piece solid golf ball of claim 1, wherein the outer layer and the intermediate layer have a relationship that satisfies the following conditions:

(material hardness of outer layer)≤(material hardness of intermediate layer); and
(thickness of outer layer)≤(thickness of intermediate layer).

7. The multi-piece solid golf ball of claim 1, wherein the polycarbodiimide is nonionic.

* * * * *